F. P. WILLIAMS.
LEAD RING.
APPLICATION FILED NOV. 17, 1910.
1,017,030.
Patented Feb. 13, 1912.
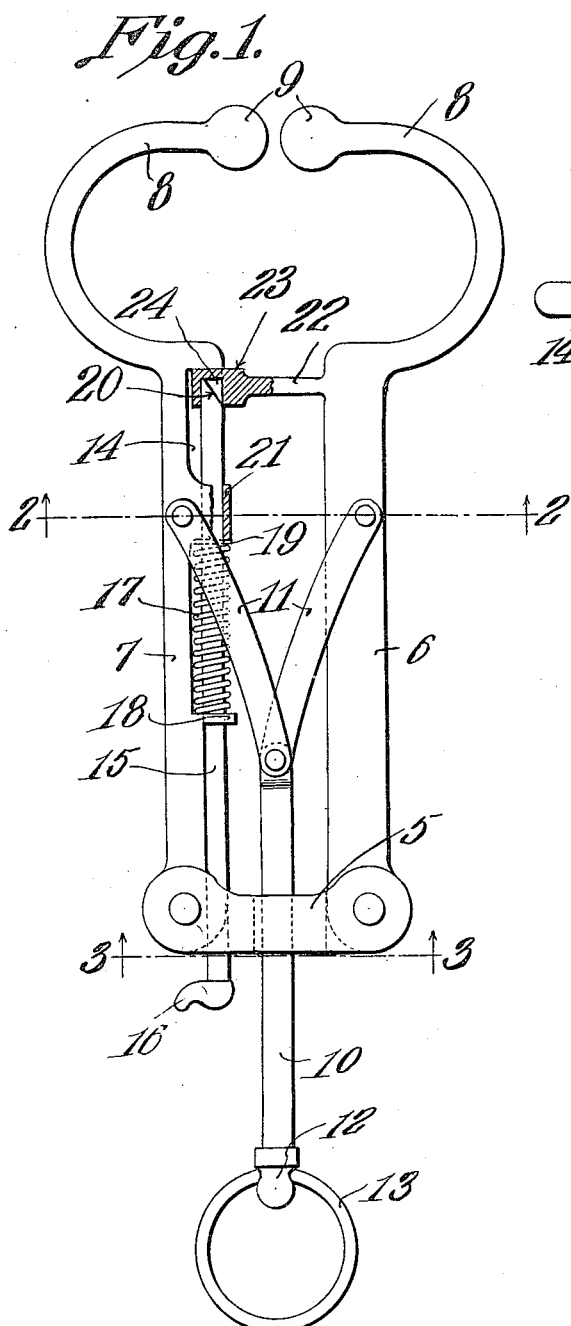
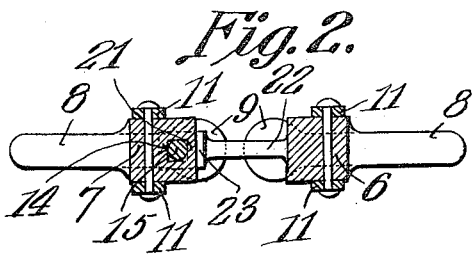
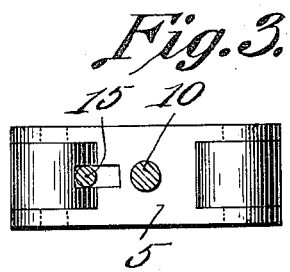
Witnesses
Frank P. Williams,
Inventor
by C. A. Snow & Co.
Attorneys

UNITED STATES PATENT OFFICE.

FRANK P. WILLIAMS, OF BURLINGTON, KANSAS.

LEAD-RING.

1,017,030.  Specification of Letters Patent.  Patented Feb. 13, 1912.

Application filed November 17, 1910. Serial No. 592,912.

*To all whom it may concern:*

Be it known that I, FRANK P. WILLIAMS, a citizen of the United States, residing at Burlington, in the county of Coffey and State of Kansas, have invented a new and useful Lead-Ring, of which the following is a specification.

It is the object of the present invention to provide an improved device for leading animals.

The invention aims primarily to provide a device for leading animals, embodying jaw members designed to grip the cartilage of the animal's nose.

Incidentally, the invention aims to provide a device for the purpose stated adapted to be readily and quickly applied and disconnected.

A further object of the invention is to provide a device of this class so constructed that when the jaws are closed, they will be held in such position and the lead strap which is to be connected to the device may be grasped for the purpose of leading the animal, it being unnecessary to pay any further attention to the device itself until it is desired to disconnect the same.

In the accompanying drawing, Figure 1 is a view in elevation of the device embodying the present invention. Fig. 2 is a sectional view on the line 2—2 of Fig. 1 looking in the direction indicated by the arrows. Fig. 3 is a similar view on the line 3—3 Fig. 1.

In the drawing the numeral 5 indicates a head to the ends of which are pivoted arms 6 and 7. At their free ends, each of the arms 6 and 7 is formed with a substantially semi-circular gripping jaw 8 the extremities of these jaws being formed with spherical enlargements 9 which contact with the cartilage of the animal's nose and owing to their spherical form, grip the cartilage without injuring the same or causing pain. A rod 10 is slidably fitted through the head 5 and pivoted to the end of this rod which projects between the arms 6 and 7 are links 11, there being two pairs of such links, one pair connecting the said end of the rod and the arm 6 and the other pair connecting the said end of the rod and the arm 7. Swiveled to the rod 10 at its opposite end as at 12 is a ring 13 which may be grasped or to which may be connected a lead strap, as may be desired. At this point it will be readily understood that by sliding the rod 10 in the direction of the free ends of the arms 6 and 7, the corresponding ends of the links 11 will be spread thereby swinging the arms, upon their pivots, away from each other and opening the jaws 8. Also it will be understood that by sliding the rod 10 in the opposite direction, the arms 6 and 7 will be swung toward each other to close the jaws 8 or in other words to bring them to substantially the position shown in Fig. 1 of the drawing.

In the side which opposes the arm 6, the arm 7 is formed with a lengthwise extending groove 14 and slidably fitted in this groove is a latch rod 15 having at its end adjacent the ring carrying end of the rod 10 a finger piece 16 which may be grasped for the purpose of retracting the latch rod against the tension of a spring 17 arranged thereon and bearing at one end against a lug 18 integral with the arm 7 and at its opposite against a strap pin 19 carried by the said latch rod. It will be understood from the foregoing that the spring 17 normally holds the latch rod substantially in the position shown in Fig. 1 of the drawing in which position its end opposite its end which carries the finger piece 16, will be presented toward and but slightly spaced from that end wall of the groove 14 adjacent the free end of the arm 7. This end of the latch rod is beveled as indicated by the numeral 20. The movement of the latch rod in the direction stated, is limited by the abutment of the pin 19 against a closed portion 21 of the groove. The arm 6 carries a keeper for the latch rod which keeper includes a shank 22 preferably integral with the arm and a head 23 formed at the outer end of the shank. This head has a recess 24 in its under side for the reception of the beveled end 20 of the latch rod when the arms 6 and 7 are in the position shown in Fig. 1 of the drawing.

From the foregoing description of the invention it will be readily understood that, the elements of the device being in the potion shown in Fig. 1 of the drawing, the latch rod 15 may be drawn toward the ring carrying end of the rod 10 against the tension of the spring 17 to disengage its beveled end from the recess in the keeper head 23. The arms 6 and 7 may then be separated by sliding the rod 10 in the direction of the jaw carrying ends of the arms 6 and 7. The device is then disposed with the jaws 8 projecting into the nostrils of the animal to be led and the rod 10 is then moved in a direction opposite to that just stated so as to swing the arms 6 and 7 toward each other and close the jaws 8. When thus closed, the spherical ends 9 of the jaws will be sufficiently spaced to receive between them the thinner portion of the wall of cartilage between the animal's nostrils, but not to such degree as to permit of passage between them of the thicker outer portion of this wall. Also, when the arms are in the position stated, the beveled end of the latch rod will be in engagement with the keeper carried by the arms 6 and the arms and their relative jaws will be held against separation. The device being thus applied, the ring 13 may be gripped or a strap may be connected to this ring for the purpose of leading the animal.

What is claimed is:—

The combination with two pivoted jaws of a lead ring, one of said jaws having a shouldered portion and the other a shank provided with a recessed outer end, said shank when the jaws are toward each other abutting the shouldered portion, of a slidingly mounted rod carried by the jaw having the shouldered portion and having a finger pin upon its free end and its inner end disposed to seat within the recess of the shank, and a spring upon the rod for holding the rod and shank so that its lock engaging end will seat within the recessed portion of the shank and hold the jaws in closed and spaced relation.

In testimony that I claim the foregoing as my own, I have hereto affixed my signature in the presence of two witnesses.

FRANK P. WILLIAMS.

Witnesses:
 JOE ROLSTON,
 RALPH A. WOODFORD.

---

Copies of this patent may be obtained for five cents each, by addressing the "Commissioner of Patents, Washington, D. C."